United States Patent [19]

Wadsworth

[11] 4,190,911
[45] Mar. 4, 1980

[54] CONVERTIBLE COUCH

[76] Inventor: Craig D. Wadsworth, 107 26 Ave., Apartment 9, St. Petersburg Beach, Fla. 33706

[21] Appl. No.: 906,451

[22] Filed: May 17, 1978

[51] Int. Cl.² .............................................. B60P 3/338
[52] U.S. Cl. ....................................... 5/44 R; 5/12 R; 5/41; 296/69
[58] Field of Search ....................... 5/89, 12 R, 35, 36, 5/37, 41–45; 108/44; 296/64 R, 69; 297/118, 119

[56] References Cited

U.S. PATENT DOCUMENTS

| | | | |
|---|---|---|---|
| 1,465,925 | 8/1923 | Steel | 5/35 |
| 2,291,391 | 7/1942 | Krakauer | 5/44 R |
| 3,312,984 | 4/1967 | Hagstrom | 5/12 R |
| 3,423,772 | 1/1969 | Mainguy | 5/2 R |
| 3,727,970 | 4/1973 | Delmage | 296/69 |

Primary Examiner—Casmir A. Nunberg
Attorney, Agent, or Firm—Dennis H. Lambert

[57] ABSTRACT

A convertible couch, particularly for use in vans and other recreational or leisure vehicles, includes a seat and a back hinged relative to one another, and a pair of side supports having multiple supporting surfaces arranged to engage and support the seat and back in plural positions of the seat and back. The arrangement of the supporting surfaces is such that the seat and back are firmly held in position without requiring the use of separate fasteners or linkages and the like and thus, the convertible couch is both economical to make and safe to use in moving vehicles. Additionally, the arrangement of the supporting surfaces and their cooperation with the seat and the back is such that a balance is achieved which renders the convertible couch easy to manipulate in its movements from a couch position to a bed position and vice versa. Further, the use of side supports constructed in accordance with the invention in cooperation with the hinged seat and back enables a king size bed to be obtained in a van or other recreational or leisure vehicle, and the convertible couch may be easily and quickly removed from the vehicle without loosening fasteners and the like.

16 Claims, 10 Drawing Figures

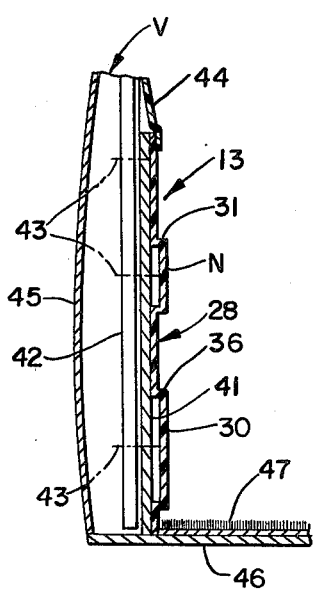
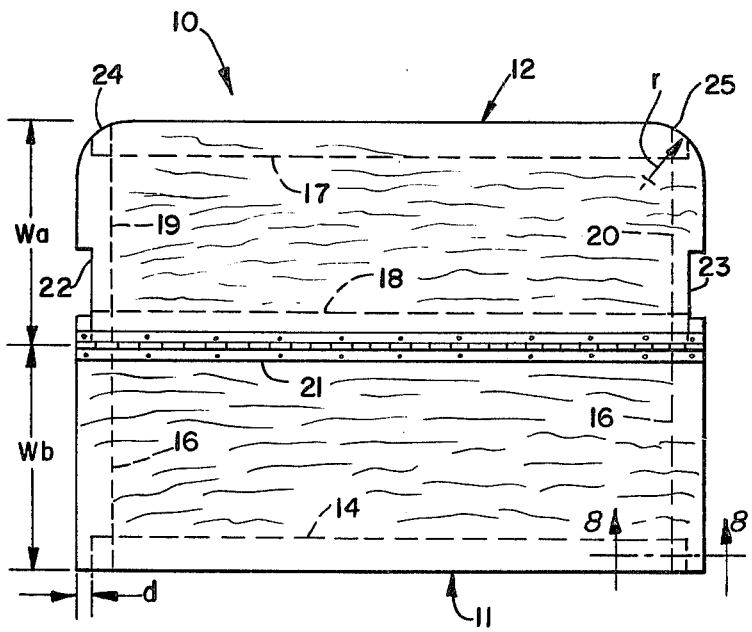
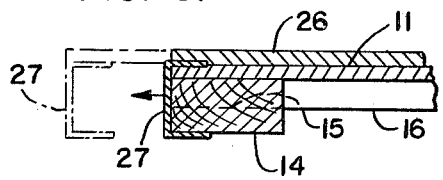
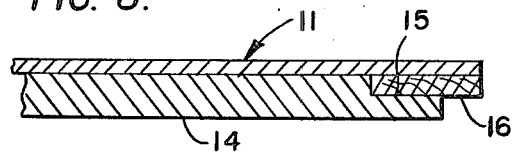
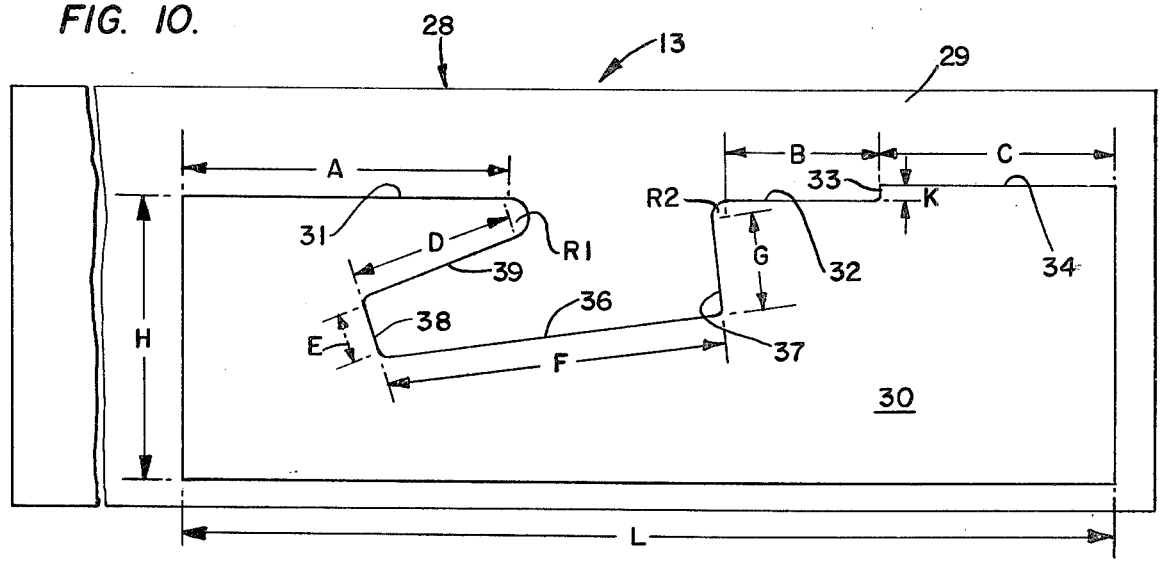

CONVERTIBLE COUCH

BACKGROUND OF THE INVENTION

This invention relates generally to convertible furniture, and more particularly, to a couch or lounge which is convertible to a bed. The convertible couch or lounge has particular utility in vans or other recreational and leisure vehicles, but is equally as well suited to use in homes and the like for furniture.

Many different types of convertible couches and lounges, and many different approaches to the structure thereof, have been made in the prior art as exemplified, for example, by U.S. Pat. Nos. 3,312,984, 3,946,678, 1,163,460 and 2,848,273. However, these prior art devices have one or more disadvantages. For example, they are either relatively expensive and cumbersome in construction and occupy an excessive amount of space, or require the use of separate fasteners and linkages and the like to secure them in position and enable them to be moved from sitting to horizontal positions. Additionally, all such beds known to applicant are limited in length by the width of the vehicle, resulting in a bed of substandard length, i.e. 5 feet, 6 inches.

The present invention, on the other hand, provides a convertible couch or lounge which is particularly suitable for use in vans, since the couch occupies very little space when in an upright lounge position, and at the same time provides substantial storage space beneath and behind the lounge. Moreover, the lounge or couch is securely supported in its couch position without requiring the use of separate fasteners, such as bolts or the like, or linkages, or other complex mechanical devices. The couch or lounge is easily moved into a horizontal position to define a sleeping surface or bed and, in fact, the bed provided by the present invention is the only one known to applicant which provides a truly king size bed, which is 6 feet long and 5 feet, 8 inches wide, and in a van permits the user to sleep lengthwise of the van, whereas prior art beds for sleeping in vans require the user to sleep crosswise. Another feature of the present invention, which makes it particularly desirable for vans and the like, is the ability to simply fold up the couch or lounge of the invention and lift it from the van, thus providing a large, uninterrupted space for hauling large objects and the like. Frequently, persons owning vans desire to use them as utility vehicles for hauling materials or the like and in these instances, they generally are not able to utilize their van as a luxury or recreational vehicle since the fixtures and components placed therein to convert the van to a luxury or recreational vehicle are not readily removed for use of the van as a utility vehicle.

OBJECTS OF THE INVENTION

Accordingly, it is an object of this invention to provide a convertible couch or lounge which is constructed with side support members configured to engage and support opposite end portions of the couch or lounge whereby a balance is achieved enabling the seat and back portion of the couch or lounge to be easily moved from a seating position to a horizontal sleeping surface position.

A further object of the invention is to provide a convertible couch or lounge which is particularly suitable for use in recreational or leisure vehicles, and which is securely supported in a seating position without requiring the use of separate fasteners or the like.

A still further object of the invention is to provide a convertible couch or lounge for use in recreational or leisure vehicles and the like wherein a seat and back portion are pivotally connected together and are supported at their opposite ends on side or end support members which are configured to provide a balance to movement of the seat and back portions, whereby the seat and back portions may be very easily moved between their seating positions and sleeping positions without requiring the use of linkages or separate fasteners and the like.

An even further object of the invention is to provide a convertible couch or lounge for use in vans or other recreational vehicles and the like which is simple and economical in construction and is easy to use and which includes an extendable leaf portion whereby when the convertible couch or lounge is in a horizontal sleeping surface position, a king size bed is provided.

BRIEF DESCRIPTION OF THE DRAWINGS

FIG. 4 is a view similar to FIG. 3 showing the convertible couch of the invention in a first sleeping position wherein it is suitable for use as a child's bed, or daybed or the like.

FIG. 6 is an enlarged fragmentary view in section, taken along line 6—6 in FIG. 1.

FIG. 7 is a plan view of the convertible couch in the position shown in FIG. 4 but with the extended leaf removed.

FIG. 8 is an enlarged fragmentary sectional view taken along line 8—8 in FIG. 7.

FIG. 9 is an enlarged fragmentary sectional view taken along line 9—9 in FIG. 4.

FIG. 10 is a view in elevation of one of the side support panels.

DETAILED DESCRIPTION OF THE INVENTION

Figure 1:
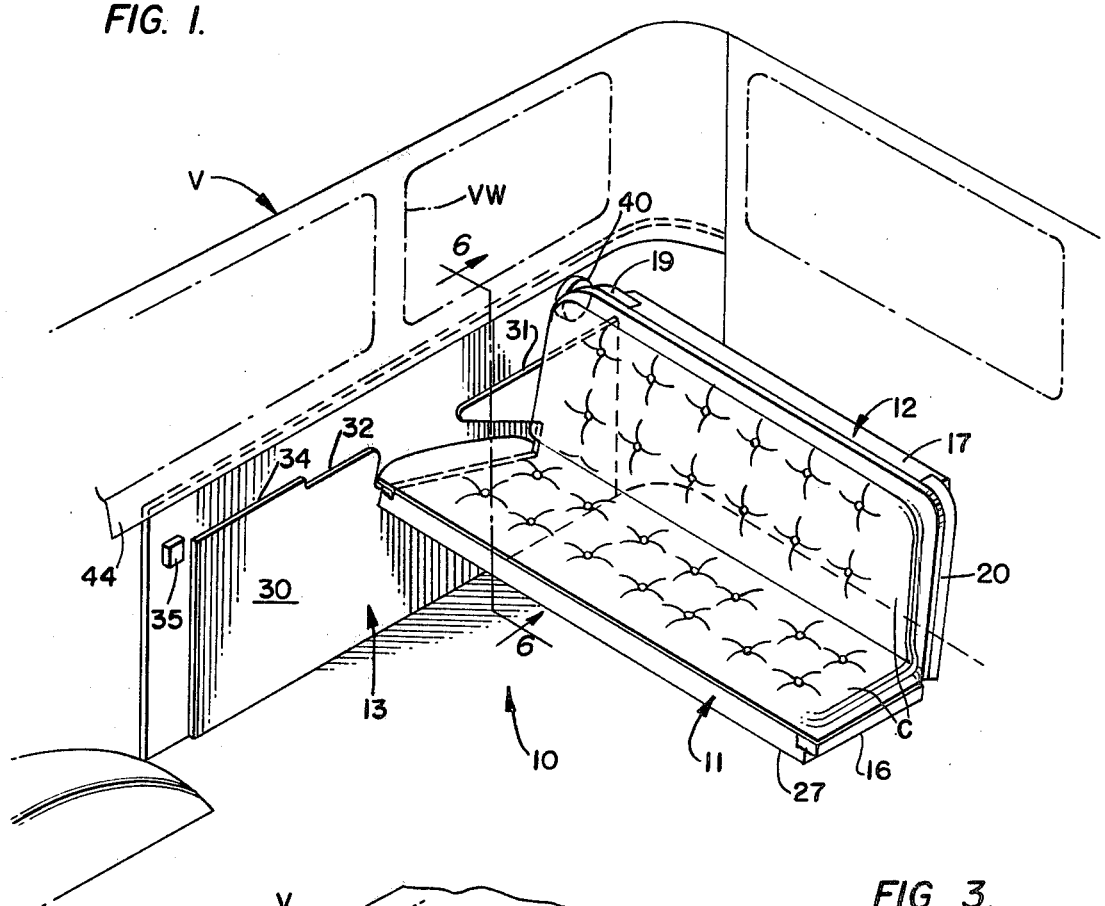
FIG. 1 is a fragmentary perspective view of a convertible couch or lounge according to the invention shown in a seating position inside a van.

In the drawings, wherein like reference numerals indicate like parts throughout the several views, a convertible couch or lounge in accordance with the invention is indicated generally at 10 and comprises a substantially horizontal seat portion 11 and an upright backrest portion 12 hingedly joined to the seat portion. The back and seat portions are supported at their opposite ends on side support structures 13 suitably secured to the side walls of a vehicle such as a van V or the like which may have windows VW. As seen in FIG. 1, suitable cushions C are preferably supported on the seat and backrest portions 11 and 12 during use of the invention as a couch or lounge. The seat and back 11 and 12 each comprise a three-eighths inch thick sheet of plywood having widths Wa and Wb, respectively, of about two feet and a length L of about five feet eight inches, or any other dimensions depending upon the width and length desired.

Referring more particularly to FIGS. 7, 8, and 9, the seat 11 includes a 2×4 frame 14 extending lengthwise across the front edge of the seat 11 and having an undercut portion 15 at each end thereof for receiving the side frame members 16 which comprise 1×4's or the like secured to and extending along opposite sides or ends of the seat 11. Any suitable fastening means such as nails or glue and the like may be used, and of course it is not essential that 2×4's, 1×4's and three-eighths inch thick plywood be used, but these materials and dimensions have been found particularly suitable for the purpose. Moreover, the 2×4 frame member 14 terminates short of the opposite sides or ends of the seat a dimension d for clearance of the side support members. In a specific construction according to the invention this dimension d equals about one and one-half inches.

The backrest portion 12 also includes a 2×4 frame member 17 secured to and extending along the top edge of the back, and 2×4 frame member 18 secured to and extending along the bottom edge of the back. As with the seat portion, these frame members 17 and 18 terminate short of the opposite ends or sides of the backrest 12. Further, 1×4 frame members 19 and 20 are secured to and extend along opposite ends or sides of the backrest in a manner substantially identical to that indicated at 16 for the seat portion 11.

A suitable hinge means 21, such as continuous piano hinge or the like, pivotly connects the seat and back portions 11 and 12 together.

As seen best in FIG. 7, opposite side portions of the backrest 12 are notched or cut away as at 22 an 23 for cooperation with the side supports in a manner to be later described. Additionally, the opposite upper corners of the backrest 12 are rounded as at 24 and 25 with a radius r.

Figure 4:
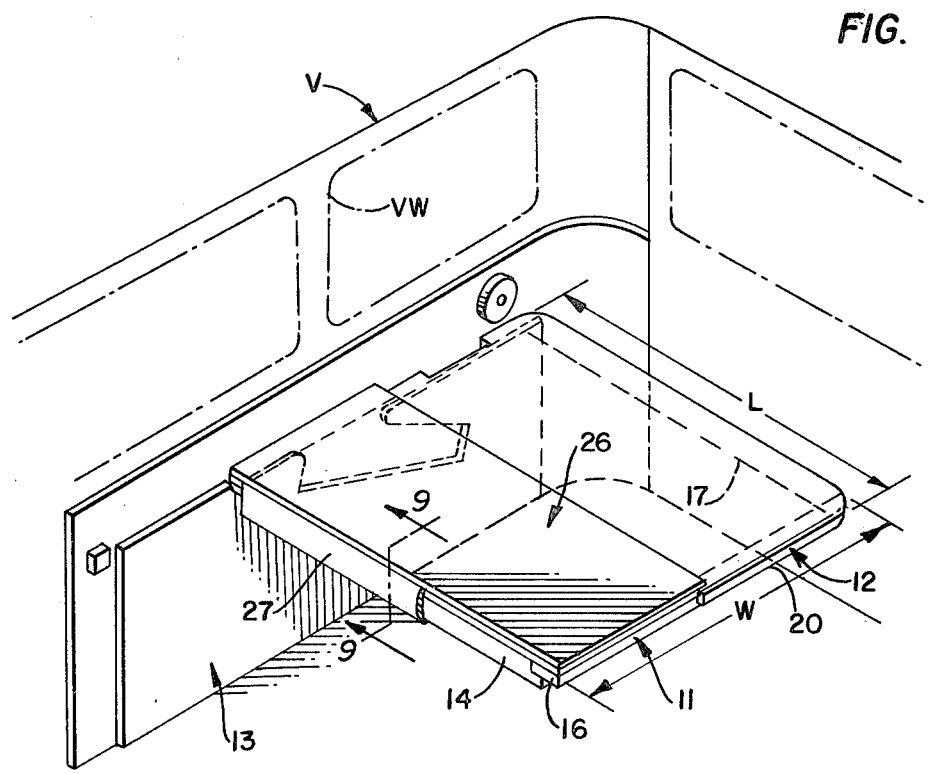
Figure 5:
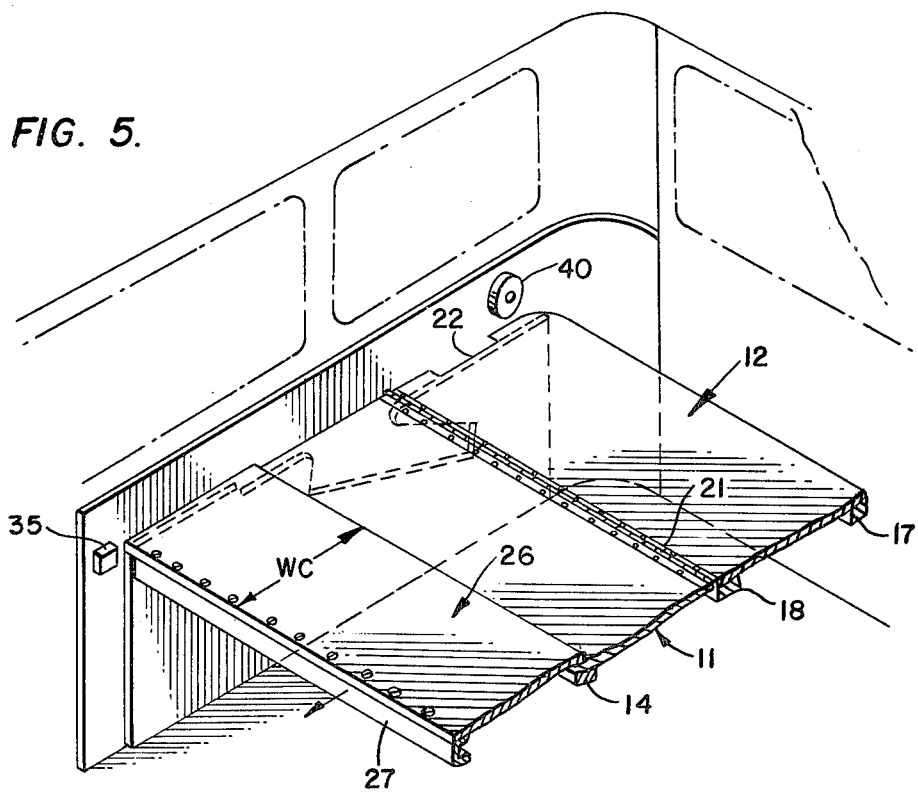
FIG. 5 is a view similar to FIG. 4 showing the convertible couch of the invention extended to its full length to provide a king size sleeping surface.

As seen best in FIGS. 4, 5, and 9, the seat portion 11 includes an extension leaf 26 preferably formed of three-eighths inch thick plywood and having a width WC of about twenty-three inches. The extension leaf 26 has an angle member 27 secured to the front edge thereof on the underside and the angle member 27 preferably comprises an aluminum channel having dimensions of two and a quarter inches by one and a half inches. The angle member 27 terminates at its opposite ends spaced inwardly from the opposite side edges or ends of the seat portion 11 by a suitable distance, as for example one and a half inches, and the angle member may be secured to the extension 26 in any suitable manner. One specific fastening means for securing the angle member to the extension is by the use of flat-head screws and T-nuts, spaced on six inch centers.

A couch or lounge constructed in accordance with the invention thus has a seat portion 11 with a width of about two feet and a length of about five feet eight inches, and a backrest 12 with a height of about two feet and a length of about five feet eight inches. Moreover, when the couch is converted into a bed, as seen in FIG. 4, a sleeping surface having a width W of about four feet and a length L of about five feet eight inches is provided. The sleeping surface may be expanded to form substantially a king size bed as indicated in FIG. 5, wherein the bed has a length in the longitudinal direction of the vehicle V of nearly six feet, and a width transversely of the vehicle of about five feet eight inches. When the bed is in its extended or expanded position, as seen in FIG. 5, the leaf or extension member 26 is supported at its rear edge on the front edge of seat portion 11, and the opposite ends thereof are supported on the side supports 13. The channel member 27 reinforces and supports the front edge of the extension. Still further, as can be clearly seen in the drawings, there is substantial storage space both beneath and behind the convertible couch or lounge and the convertible couch or lounge may be readily removed from the vehicle when desired simply by folding it up and lifting it from the vehicle. There is no necessity of removing any separate fasteners or disconnecting any linkages and the like.

The side support panels 13 are seen most clearly in FIGS. 6 and 10 and comprise a formed plastic member 28 which may be suitably molded or shaped to the desired configuration and which in a preferred construction comprises one-eighth inch thick Kydex plastic or ABS plastic. The formed plastic panel or member 28 is shaped with a rectangular panel 29 having a raised portion 30 thereon defining a pair of substantially coplanar, aligned, spaced apart, elongate support shoulders or ledges 31 and 32 thereon having lengths A and B, respectively. The length A is approximately the same as the width Wa or Wb of the seat or back portion 11 and 12, respectively, and the distance from adjacent the forward end of shoulder 31 (the right-hand end as viewed in FIG. 10) to the distal or far end of surface 32 is also approximately the same as the width Wa or Wb of one of the seat or backrest portions 11 and 12, whereby when the couch is raised to an elevated sleep-defining surface, as seen in FIG. 4, the backrest portion 12 is supported on shoulder 31 and the seat-defining portion 11 extends from the rounded forward end of shoulder 31 to the distal end of shoulder 32.

The raised portion 30 is also formed with an upwardly projecting abutment 33 at the forward end of shoulder 32, and the abutment 33 has a height K approximately equal to the thickness of the seat-defining portion 11 of the couch. Thus, when the couch is raised to a first bed-defining position, as seen in FIG. 4, the abutment 33 engages against the forward edge of seat portion 11 to prevent forward sliding movement of the convertible couch.

The raised portion 30 of panel 28 continues forwardly from abutment 33 in parallel relationship with shoulders 31 and 32, defining a further support shoulder or surface 34 on which the extension leaf 26 is supported when it is pulled forwardly as seen in FIG. 5. Thus, the extension supporting shoulder 34 has a length C slightly less than the width Wc of the extension 26. A suitable stop member 35 is secured to the panel 28 just forwardly of the forward end of shoulder 34 to define a stop for the extension 26.

The raised portion 30 of panel 28 is formed with a recessed area of pocket between the shoulders 31 and 32, defined by a sloping bottom shoulder or supporting surface 36 having an upwardly and slightly rearwardly extending abutment 37 at the forward end thereof and at substantially right angles to the plane of shoulder or surface 36. The upwardly extending abutment 37 is connected with the support shoulder 32 by a rounded shoulder defined by radius R2. A rear abutment 38 extends upwardly from the rear or lower end of support shoulder 36 and is joined with an upwardly and forwardly extending surface 39 which terminates at its upper and forward end in a rounded shoulder defined by radius R1, which joins the surface 39 with shoulder or support surface 31.

Figure 2:
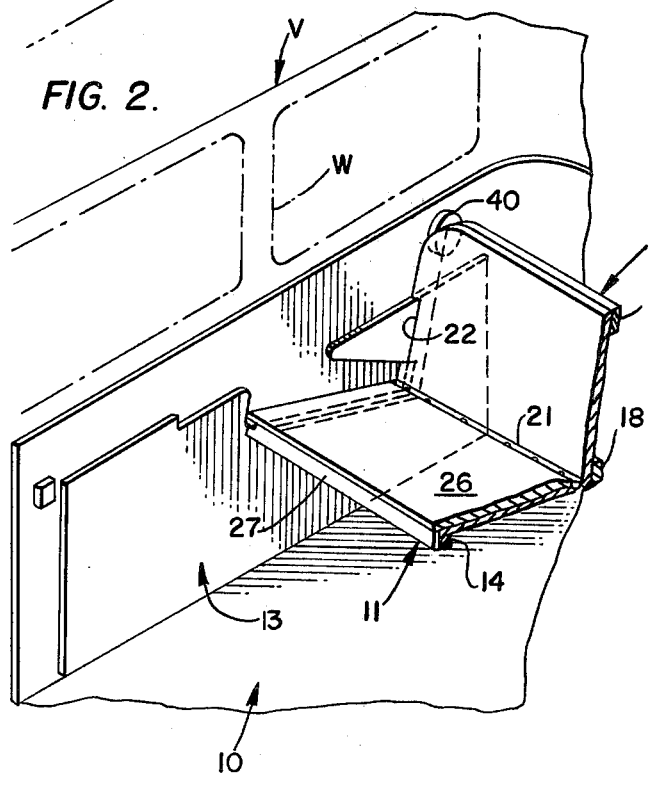
FIG. 2 is a fragmentary view similar to FIG. 1, with portions shown in section, and wherein the cushions are removed to better illustrate the details of the convertible couch according to the invention.

The dimensions of the various support surfaces, shoulders, abutments, and rounded shoulders, and the angular relationships thereof are selected such that a convertible couch made in accordance with the invention may normally be supported thereon as seen in FIG. 1 with the opposite ends of the seat 11 supported on respective shoulders or surfaces 36 between abutments 37 and 38, and thus securely maintained in position by the side supports at the opposite sides of the vehicle. The backrest 12 extends upwardly from the seat 11 and the lower portion thereof is engaged with abutment 38 while the notches or cutouts 22 and 23 are engaged on the surfaces 31 and 39 defined at the top and bottom of the forwardly projecting arm-like configurations of raised portions 30 to support the back in an upright position. Additionally, a disc-like or curved support member 40 is secured to the panel adjacent the upper rear portion of backrest 12 to assist in supporting the backrest in an upright position during use. The close fitting cooperation between the notches 22 and 23 at opposite sides of the backrest 12 on the arms of forwardly projecting portions defined by shoulders or surfaces 31 and 39 is such that the backrest cannot tilt forwardly more than a few degrees when it is positioned in its couch-defining mode as seen in FIGS. 1 and 2. Thus, a couch or lounge structure is provided by the invention which is secure in its selected positions and does not require separate fasteners or the like to maintain it in its positions.

Figure 3:
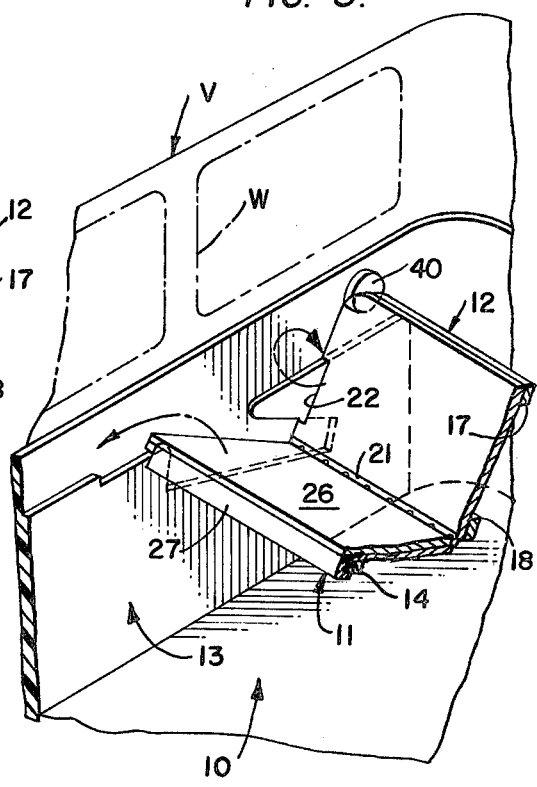
FIG. 3 is a view similar to FIG. 2 with the convertible couch being moved from a seating position toward a sleeping position.

When it is desired to elevate the couch or lounge to form a bed, the forward edge of the seat portion 11 is grasped and lifted upwardly onto the top of shoulders or surfaces 32 as seen in FIG. 3 and simultaneously pulled forwardly. This results in the backrest portion 12 tilting rearwardly and sliding along the arm-like projections defined by surfaces 31 and 39 until the notches come free of the arm-like projections at which time the elevated backrest and seat members are pushed rearwardly to the position seen in FIG. 4 with the front edge of seat member 11 dropped behind the abutment 33. The hinged area 21 of the connected seat and backrest portions is supported on the forward end of shoulder 31 when in the position shown in FIG. 4. If it is desired to provide a king size bed or larger bed for accommodating adults, the extension leaf 26 is merely pulled forwardly onto the aligned support surfaces of shoulder 34 until the forward edge thereof engages abutment 35.

In a typical construction, the panel 28 may have any desired dimensions, but in a preferred construction for use with a seat and backrest having the dimensions as described previously herein, the height H of the raised portion 30 may be approximately twenty to twenty-four inches and the length L thereof may be five feet eight inches to six feet or the like. The shoulders or surfaces 31 and 32 have dimensions A and B of about two feet and about one foot, respectively, and the shoulder 34 has a length C of about one foot five inches. The radius R1 may be about two inches, and the radius R2 may be about one and one quarter inches. The abutment 37 may have a height or length G of about seven inches. The support surface or shoulder 36 may have a length slightly greater than two feet, while the abutment 38 at the rear end thereof may have a height or length E of about four and one half inches. The surface 39 extending forwardly and upwardly from the upper end of abutment 38 may have a length D of about thirteen inches.

The panel 28 is preferably suitable secured to a plywood backup panel 41 which is in turn suitably secured to the structural frame members 42 of the vehicle sidewall by means of pop rivets or the like 43. The panel 28 may be secured to the plywood backup 41 by means of screws and adhesive or other fasteners as desired.

If the convertible couch of the invention is used in a vehicle having windows VW therein, the upper edge of the side supports 13 may be inserted beneath the plastic trim 44 of the vehicle, if desired, as seen in FIGS. 1 and 6.

The outer skin or sheet metal of the vehicle is indicated at 45 and the floor of the vehicle at 46. Carpet or the like 47 may be provided in the vehicle if desired.

Moreover, it should be noted that the side support panels need not necessarily be of formed plastic, but can be made of other materials. The most important concept of the present invention is the provision of a flat, hinged and notched structure which enables a seating surface to be very easily changed from a sofa to a flat, horizontal sleeping surface or bed. The interaction between the supports and body support members introduces mechanical advantages enabling the structure to be converted form one type surface to another with only very little effort required. The sofa or bed defining panels or members may be quickly and easily removed from a vehicle in which the invention is used, to provide a large, uninterrupted area for use to store or haul large items. Such removal of these members does not require tools or manipulation of separate fasteners and the like, since the unique interaction of the parts securely holds the invention in operative position without requiring separate fasteners and the like.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An article of furniture convertible from a seating position to a generally horizontal sleeping position, comprising: a seat portion and a backrest portion pivotally connected together; a pair of side support panels each having a plurality of support surfaces thereon engageable with opposite end portions of the seat portion and backrest portion to support the seat portion and backrest portion in the seating position and in the sleeping position, respectively, said support surfaces being of such size and shape in relation to one another and to the seat portion and backrest portion and bedding disposed in predetermined angular relationship to one another so that the seat portion and backrest portion are engaged therewith during movement between the seating position and the sleeping position and are thus balanced during their movement between a seating position and a sleeping position and very little effort is thus required, and wherein limit stops are associated with the support surfaces to engage both the seat portion and beckrest portion in the seating position and the sleeping position to limit fore and aft movement of the seat and backrest portions without requiring separate fasteners and the like.

2. An article of furniture as in claim 1, wherein the article of furniture comprises a couch.

3. An article of furniture as in claim 2, wherein the seat portion is hinged to the backrest portion.

4. An article of furniture as in claim 3, wherein the side support panels are each of one piece construction and have raised portions thereon defining the support surfaces.

5. An article of furniture as in claim 4, wherein the support surfaces on each panel include a first generally horizontal, elongate, upwardly facing shoulder on which the respective adjacent end of the seat portion rests, and upwardly projecting abutments at front and rear ends of the first shoulder to prevent to and fro shifting movement of the seat portion.

6. An article of furniture as in claim 5, wherein the abutment at the rear end of the first shoulder is in a plane at a predetermined angle relative to the plane of the first shoulder, and the backrest portion is engaged against said abutment.

7. An article of furniture as in claim 6, wherein a stop member is supported on the panel at a position in line with the abutment at the rear end of the first shoulder and the upper edge of the backrest portion is engaged therewith and supported thereby.

8. An article of furniture as in claim 7, wherein a second, horizontal, elongate, upwardly facing shoulder is spaced above the first shoulder, and a third, elongate, horizontal shoulder is in actual alignment with the second shoulder, said second and third shoulders engaging and supporting opposite ends of the seat and backrest portions in their sleeping positions.

9. An article of furniture as in claim 2, wherein the seat portion includes an extendible leaf, which can be extended when the article of furniture is in its sleeping position to form a king size bed.

10. An article of furniture as in claim 8, wherein a fourth elongate, horizontal shoulder is in a plane spaced above the plane of the second and third shoulders, and the seat portion includes an extendable leaf which can be extended when the article of furniture is in its sleeping position to form a king size bed, said leaf being engageable on and supported by the fourth shoulder.

11. An article of furniture as in claim 1, wherein the side support panels are each of one piece construction and have raised portions thereon defining the support surfaces, said panels being molded plastic members.

12. An article of furniture as in claim 8, wherein the backrest portion has notches formed in the opposite ends thereof in which raised portions of the panels defined between the first and second shoulders are received when the couch is in a seating position, said notches having a size and shape such that they cooperate with the raised portions to limit forward and rearward movement of the backrest portion.

13. An article of furniture as in claim 12, wherein the article of furniture comprises a convertible couch in a van and said side support panels are secured to opposite side walls of the van.

14. A combined seating and sleeping surface in a vehicle such as a van and the like, comprising: first and second side support panels secured to opposite sides, respectively, of the vehicle, and each having a plurality of support surfaces thereon, including first and second upwardly facing, generally horizontal support surfaces defined thereon at different elevations thereof, thereby defining an upper support surface and a lower support surface, and stop surfaces adjacent said first and second support surfaces; and a pair of substantially flat body supporting panels pivotally connected together along one adjacent edge thereof, said body supporting panels spanning the width of the vehicle between the side support panels, and opposite ends of one of the body supporting panels normally resting on and supported by the lower support surface, thus defining a generally horizontal seating surface, the other of said body supporting panels having means at the ends thereof engaged with the upper support surfaces of the respective side support panels and supported thereby in a generally upright position to define a backrest and positively restrained to relatively small fore and aft movement, said body supporting panels each engaging respective ones of said stop surfaces whereby movement of the body supporting panels is restrained, and said one body supporting panel is easily manually movable from said lower support surface to an upper support surface, with said body supporting panels disposed substantially coplaner with one another to define a substantially flat, horizontal sleeping surface.

15. A combined seating and sleeping surface in a vehicle, such as a van and the like, comprising: a pair of substantially flat side support panels secured to opposite sides, respectively, of the vehicle, each said panel having a plurality of support surfaces defined thereon; and first and second substantially flat body supporting panels pivotally joined together along one edge thereof and spanning the width of the vehicle between the side support panels, with opposite ends of the body supporting panels engaged on and supported by the support surfaces on the side support panels, some of said support surfaces supporting the body supporting panels in a seat defining mode in one position thereof, and other of said support surfaces supporting panels in a bed defining mode in another position thereof, said support surfaces securely supporting both the body supporting panels against fore and aft and up and down movement in either of the modes without requiring separate fasteners and the like, and said body supporting panels having such dimensions when in the bed defining mode that a king size bed is defined lengthwise of the vehicle.

16. A combined seating and sleeping surface as in claim 15, wherein one of said body supporting panels defines a seat portion when the body supporting panels are in a seat defining mode, and includes an extendable leaf of approximately the same dimensions as said one body supporting panel and is normally in contiguous, flat, superposed, aligned engagement therewith but is slidable relative thereto to an extended position to define said king size bed.

* * * * *